No. 657,638. Patented Sept. 11, 1900.
W. BOWKER, Sr.
SECONDARY BATTERY PLATE.
(Application filed Jan. 19, 1900.)
(No Model.)

Witnesses:
F. L. Ourand.
Grace P. Brenton.

Inventor:
William Bowker Sr.
by Geo. W. Evans
Attorney.

THE NORRIS PETERS CO., PHOTO-LITHO., WASHINGTON, D. C.

UNITED STATES PATENT OFFICE.

WILLIAM BOWKER, SR., OF WALTHAM, MASSACHUSETTS.

SECONDARY-BATTERY PLATE.

SPECIFICATION forming part of Letters Patent No. 657,638, dated September 11, 1900.

Application filed January 19, 1900. Serial No. 2,071. (No model.)

*To all whom it may concern:*

Be it known that I, WILLIAM BOWKER, Sr., a citizen of the United States, residing at Waltham, Middlesex county, Massachusetts, have invented certain new and useful Improvements in Secondary-Battery Plates, of which the following is a specification.

The object of the invention is to simplify and cheapen the production of secondary-battery plates by utilizing a natural vegetable fibrous network, such as loofah or luffa, as the binding medium for the lead oxid or active material. This object is accomplished as shown in the accompanying drawings, in which—

Figure 1:
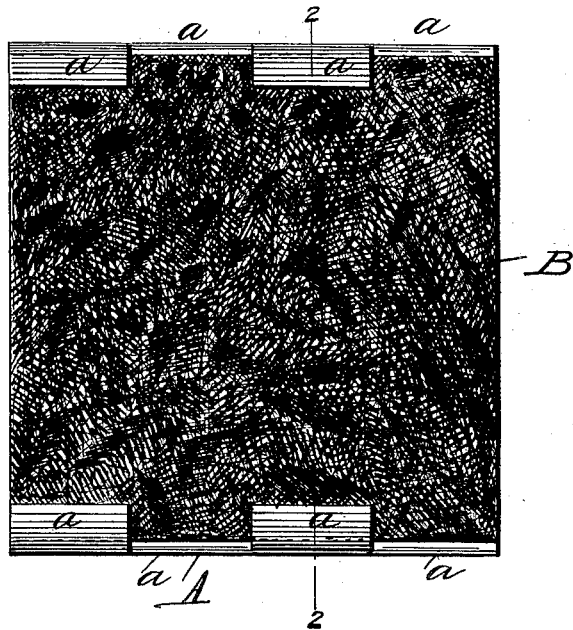
Figure 2:
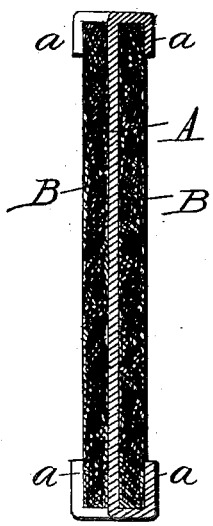
Figure 3:
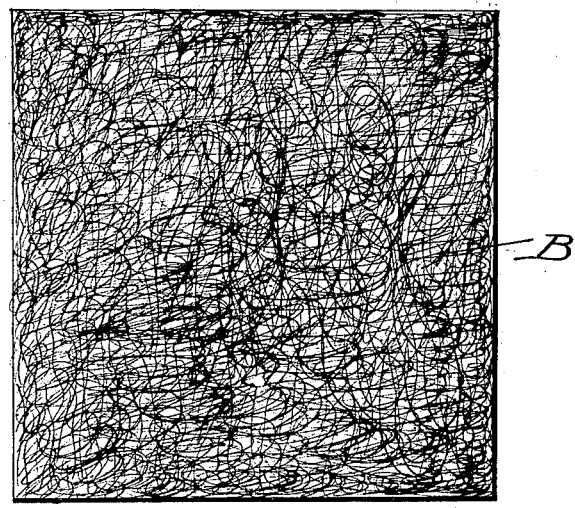

Figure 1 is an elevation of a complete plate. Fig. 2 is a transverse section thereof. Fig. 3 shows a sheet of the loofah or fibrous material.

A is the lead or conducting plate, and B B are the sheets of active material held to opposite sides of the lead plate, preferably by means of lips or ears *a a* integral with the latter and bent over the sheets B, as shown. These sheets B are formed of pieces of the fibrous material, known as "loofah" or "luffa," which is in the form of a coarse matted network, as shown in Fig. 3, into which the active material or lead oxid is placed in the form of a paste. The network is thoroughly filled with this paste, after which the battery cell or plates are formed through a long and continuous charging of electricity—say for one hundred hours more or less, or until the paste and network form a solid mass. After this the plates are in a condition to store electricity.

The advantages of my improvement are as follows: The plates are light in weight and may be manufactured cheaply. The liquid acid can percolate through them quicker and more freely than in the ordinary way. I find by actual test that the loofah resists the action of the acids used in secondary or storage batteries.

I do not confine myself to any particular species of loofah, of which there are quite a number under the natural order of *Cucurbitaceæ* of the tribe *Cucumerineæ.*

What I claim is—

1. A secondary-battery plate consisting of the lead or conducting-plate provided with lips or ears, and the sheets of natural vegetable fibrous network secured to opposite sides of the conducting-plate by said ears or lips and having a filling of lead oxid or active material.

2. In a secondary battery, a sheet or piece of loofah having a filling of active material and adapted for use in a secondary battery.

In testimony whereof I affix my signature in presence of two witnesses.

WILLIAM BOWKER, SENR.

Witnesses:
ROBERT B. JOHNSON,
EDWARD K. GRAVES.